United States Patent
Boutros et al.

(10) Patent No.: US 8,908,527 B2
(45) Date of Patent: Dec. 9, 2014

(54) USING CONTEXT LABELS TO SCALE MAC TABLES ON COMPUTER NETWORK EDGE DEVICES

(75) Inventors: Sami Boutros, San Ramon, CA (US); Yuri Tsier, Kanata (CA); Muthurajah Sivabalan, Kanata (CA); Pradosh Mohapatra, Fremont, CA (US); Clarence Filsfils, Brussels (BE); John H. W. Bettink, San Jose, CA (US); Luca Martini, Lakewood, CO (US)

(73) Assignee: Cisco Technology, Inc., San Jose, CA (US)

( * ) Notice: Subject to any disclaimer, the term of this patent is extended or adjusted under 35 U.S.C. 154(b) by 480 days.

(21) Appl. No.: 13/018,125

(22) Filed: Jan. 31, 2011

(65) Prior Publication Data
US 2012/0198064 A1    Aug. 2, 2012

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ............ 370/236; 370/225; 370/230; 370/252; 370/255

(58) Field of Classification Search
USPC .......... 370/218, 225, 230, 235, 236, 252, 255
See application file for complete search history.

(56) References Cited

U.S. PATENT DOCUMENTS

| | | | |
|---|---|---|---|
| 7,408,941 B2 | 8/2008 | Martini et al. | |
| 7,411,909 B2 | 8/2008 | Kounin et al. | |
| 7,420,933 B2 | 9/2008 | Booth, III et al. | |
| 7,522,595 B2 | 4/2009 | Ben-Dvora et al. | |
| 7,626,984 B2 * | 12/2009 | Napierala | 370/389 |
| 7,668,178 B2 | 2/2010 | Martini et al. | |
| 7,697,534 B1 | 4/2010 | Narayanan et al. | |
| 7,710,991 B1 | 5/2010 | Li et al. | |
| 7,751,399 B2 | 7/2010 | Martini et al. | |
| 7,782,841 B2 | 8/2010 | Rampal et al. | |
| 7,787,478 B2 | 8/2010 | Khouderchah et al. | |
| 7,792,027 B2 | 9/2010 | Tatar et al. | |
| 2006/0245436 A1 * | 11/2006 | Sajassi | 370/395.53 |
| 2008/0310442 A1 * | 12/2008 | Li | 370/419 |
| 2009/0028162 A1 * | 1/2009 | Hu | 370/395.53 |
| 2009/0196298 A1 | 8/2009 | Sajassi et al. | |
| 2011/0286462 A1 * | 11/2011 | Kompella | 370/395.53 |
| 2012/0198064 A1 * | 8/2012 | Boutros et al. | 709/225 |

* cited by examiner

*Primary Examiner* — Benjamin H Elliott, IV
(74) *Attorney, Agent, or Firm* — Novak Druce Connolly Bove + Quigg LLP

(57) ABSTRACT

In one embodiment, an access component of a local network edge device receives traffic, and generates a frame for the traffic that includes a remote context label that identifies an access component of the remote network edge device to which the traffic is to be forwarded upon arrival at the remote network edge device, and a virtual circuit label corresponding to a particular virtual service of the traffic. The local network edge device forwards the frame towards the remote network edge device. In another embodiment, the frame may be received at a core component of the remote network edge device, an in response to the remote context label identifying an access component of the remote network edge device, forwarded to the access component, which determines the particular virtual service, and forwards the traffic from the frame out the access component towards an endpoint for the traffic.

21 Claims, 9 Drawing Sheets

USING CONTEXT LABELS TO SCALE MAC TABLES ON COMPUTER NETWORK EDGE DEVICES

TECHNICAL FIELD

The present disclosure relates generally to computer networks, and, more particularly, to scaling media access control (MAC) address tables for virtual service instances.

BACKGROUND

Typically, linecards (LCs) of a network edge device may be classified within their distributed architecture into customer-facing or "access" linecards and core-facing or "core" linecards. If a virtual service instance, such as a virtual private local area network (LAN) service (VPLS) instance, having multiple remote peers is provisioned on such an edge device, then the core linecard is generally required to maintain a corresponding label for each virtual circuit (e.g., a pseudowire or "PW") from a remote peer and a media access control (MAC) table per virtual service instance. Such an approach does not scale well with respect to the hardware resources required on core-facing linecards. For example, a network scenario with 16K virtual service instances, five peers per instance, and 128 MAC entries per virtual service instance leads to 16K*5=80K labels and 16K*128=2M MAC entries on each core linecard. The hardware resource requirements from this model thus scale poorly with respect to number of virtual service instances.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
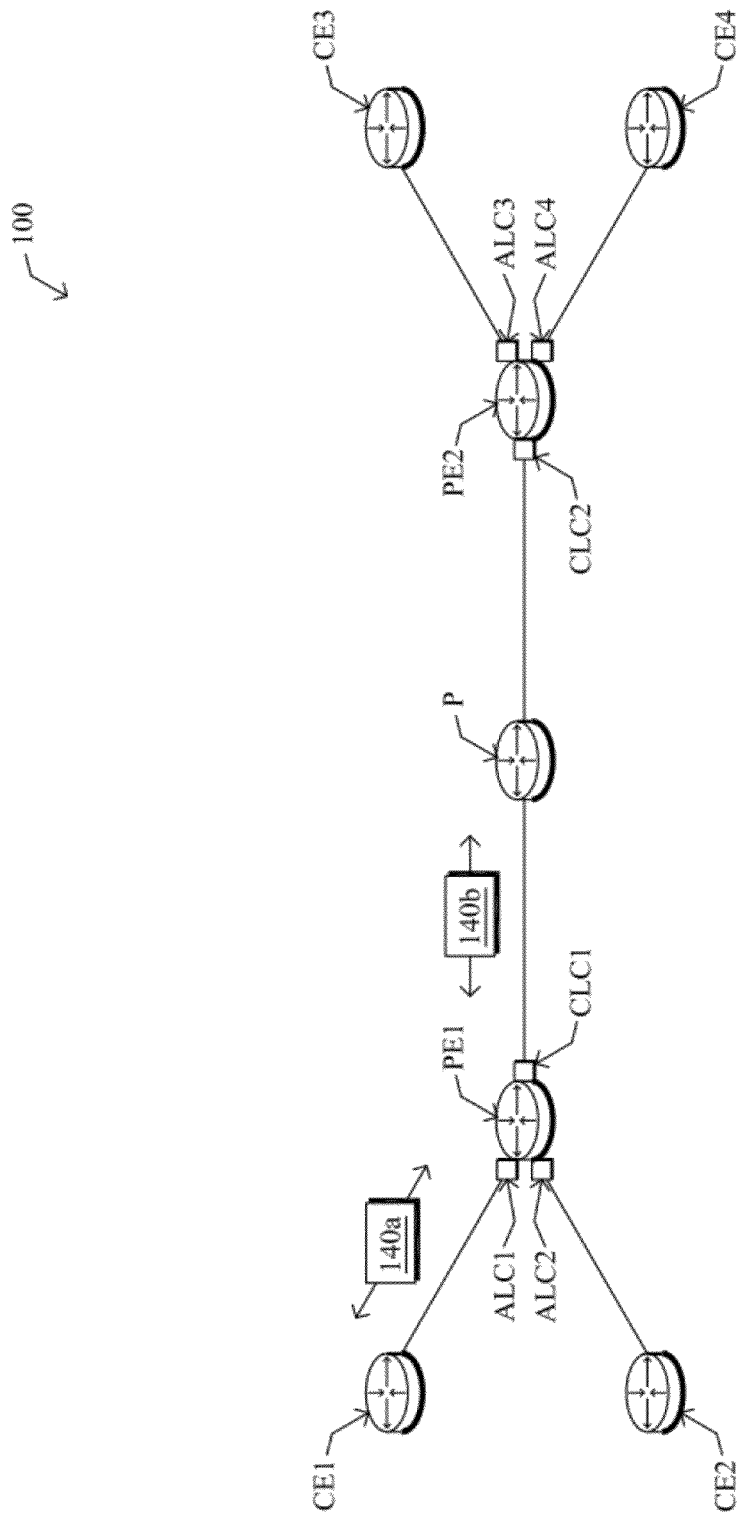
FIG. 1 illustrates an example computer network.

According to one or more embodiments of the disclosure, an access component of a local network edge device in a computer network receives traffic. If the local network edge device is aware of a remote network edge device in the computer network used to reach a destination of the traffic, it generates a frame for the traffic. The frame is constructed to include a remote context label that identifies an access component of the remote network edge device to which the traffic is to be forwarded upon arrival at the particular remote network edge device and a virtual circuit label corresponding to a particular virtual service of the traffic. The local network edge device then forwards the frame towards the remote network edge device.

Also, according to one or more embodiments of the disclosure, a core component of a remote network edge device receives the frame of traffic that includes the label stack with a remote context label and the virtual circuit label corresponding to the particular virtual service for traffic from the frame. In response to the remote context label of the label stack of the frame identifying an access component of the remote network edge device, the remote network edge device forwards the frame to the access component of the remote network edge device, determines the particular virtual service of the frame from the virtual circuit label, and forwards the traffic from the frame out the access component towards an endpoint for the traffic.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet is Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example computer network 100 illustratively comprising nodes/devices interconnected by links as shown. Illustratively, a plurality of customer edge devices (CEs) corresponding to customer networks (having one or more endpoint devices, such as work stations, computers, terminals, etc.) may communicate across a provider network consisting of provider core devices (Ps) via provider edge devices (PEs). For example, CE1 and CE2 may communicate with PE1 through corresponding access components or line cards ALC1 and ALC2, respectively. PE1 may then communicate through its core component or line card (CLC1) with one or more Ps of the provider network to reach PE2's core component CLC2. PE2 may also be in communication with CE3 and CE4 via its access components ALC3 and ALC4, respectively. Those skilled in the art will understand that any number of nodes, devices, links, etc. may be used in the computer network, and that the view shown herein is for simplicity. Those skilled in the art will also understand that while the embodiments described herein is described with relation to service provider networks and related terms, it may apply to any suitable network configuration, and may occur within an Autonomous System (AS) or area, or throughout multiple ASes or areas, etc.

Data packets (e.g., traffic 140a sent between the CEs and PEs or frames 140b sent between PEs) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2A:
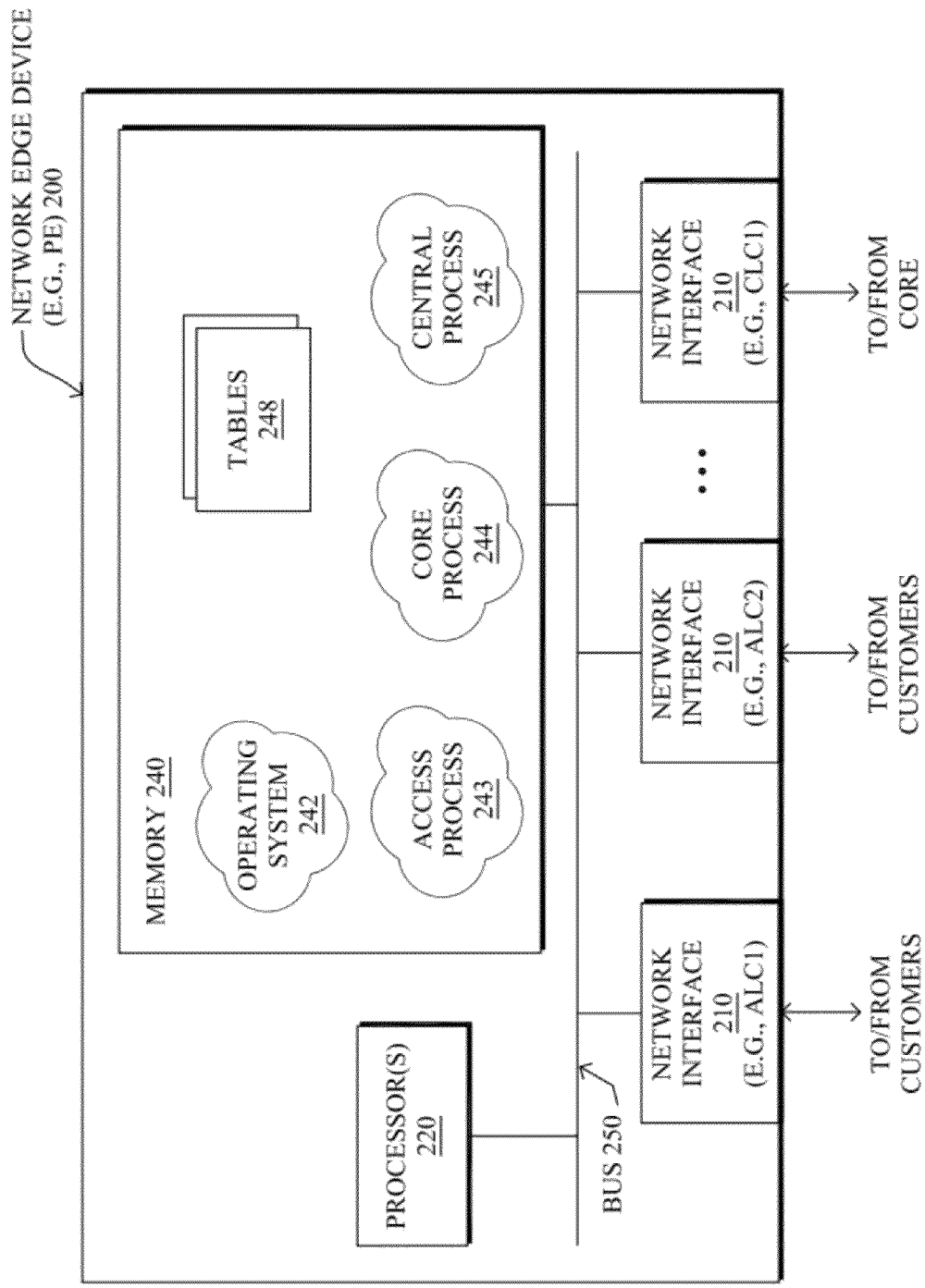
FIGS. 2A-B illustrates an example network device/node.

FIG. 2A is a schematic block diagram of an example node/device 200 that may be used with one or more embodiments described herein, such as a network edge device (e.g., PE1 or PE2). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical is networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art. Network interfaces 210 may illustratively be embodied as separate components, such as line cards (LCs), such that each component (e.g., ALC1, ALC2, and CLC1) has its own responsibilities. For example, as described herein, a core component (e.g., CLC1) may communicate frames 140b with one or more other network edge devices in a computer network, while an access component (e.g., ALC1, ALC2, etc.) may communicate traffic 140a with one or more endpoints (e.g., via CEs).

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as a table 248. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise an illustrative access process 243, a core process 244, and a central process 245, as described herein.

Figure 2B:
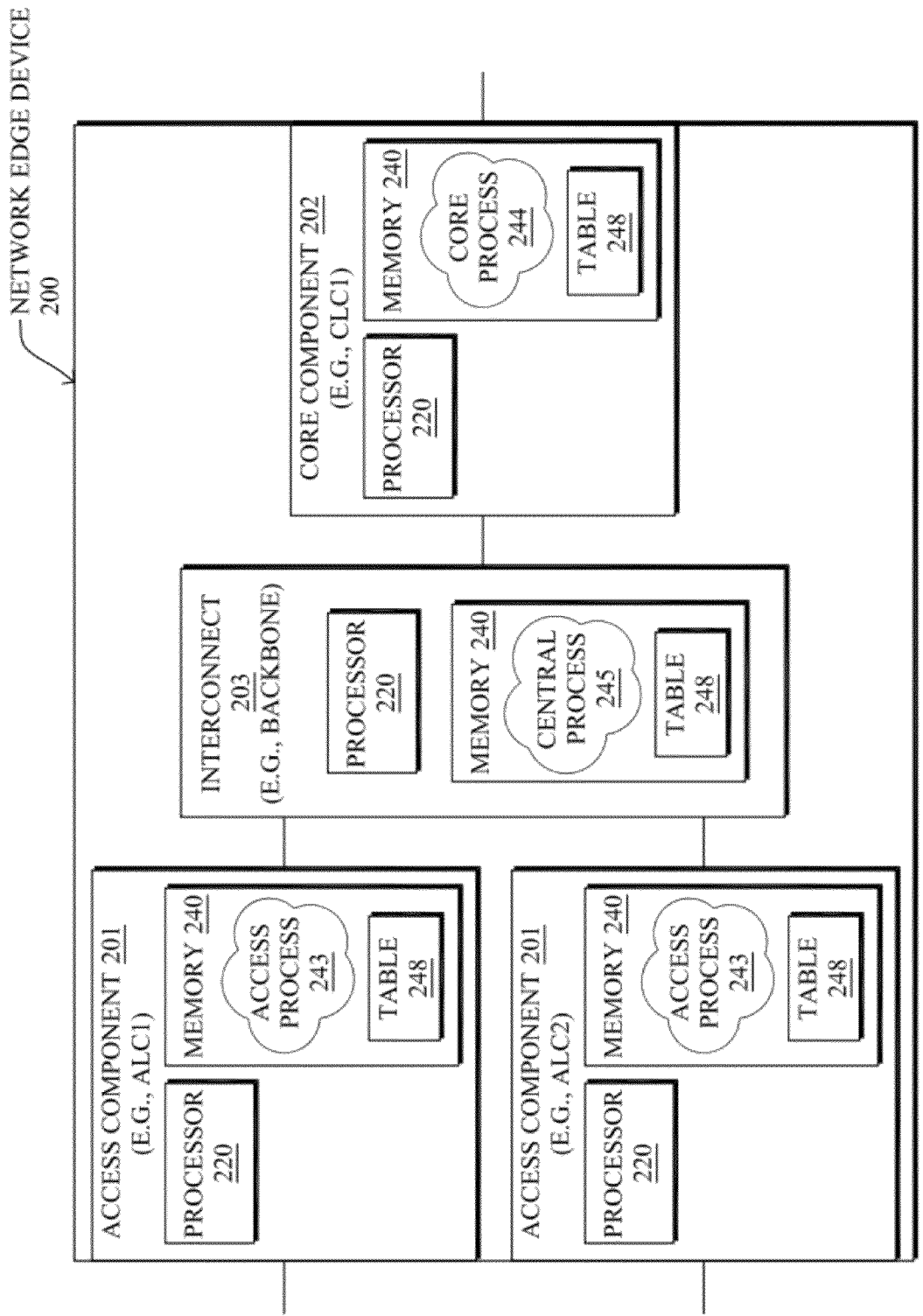

FIG. 2B is a schematic block diagram of an alternative example node/device 200 that may be used with one or more embodiments described herein. For instance, while the device as shown in FIG. 2A is a centralized architecture, a distributed architecture is shown in FIG. 2B where each component (e.g., line card) comprises its own process 220, memory 240, tables 248, and processes. For instance, each access component 201 may comprise access process 243, while a core component 202 may comprise a core process 244. A central process 245 in an interconnect component 203 (e.g., a backplane) interconnects the access components to the core component(s).

It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

As noted above, if a virtual service instance, such as a virtual private LAN service (VPLS) instance, having multiple remote peers is provisioned on such an edge device, then the core linecard is generally required to maintain a corresponding label for each virtual circuit (e.g., a pseudowire or "PW") from a remote peer and a media access control (MAC) table per virtual service instance. Such an approach does not scale well with respect to the hardware resources required on core-facing linecards. For example, a network scenario with 16K virtual service instances, five peers per instance, and 128 MAC entries per virtual service instance leads to 16K*5=80K labels and 16K*128=2M MAC entries on each core linecard. The hardware resource requirements from this model thus scale poorly with respect to number of virtual service instances.

According to one or more embodiments of the disclosure, therefore, each network edge device, e.g., each PE, may be associated with a context/component label, which represents a particular component (e.g., line card, interface, bundle, etc.) where a particular address (e.g., media access control or "MAC" address) is attached. For example, as described in detail below, in addition to conventional transport/encapsulation labels and virtual service labels (and source and destination addresses), a frame 140b may additionally comprise a remote context label indicating which access component (access line card) to which the frame is destined, and optionally a local context label to allow learning of the remote context labels.

For instance, assume that an endpoint behind CE2 desires to communicate traffic 140a with an endpoint having a destination address behind CE3. In this scenario, according to the techniques herein, PE1 may push a remote context label onto the frame 140b corresponding to the particular component of PE2 that is to receive the frame, e.g., ALC3. PE1 may also push a local context label onto the frame corresponding to ALC2 is (for CE2), such that when PE2 desires to return traffic to the particular endpoint behind CE2, it may also push the corresponding label on frames sent toward PE1. When labels are unknown, e.g., prior to learning or associating labels, then multicasting techniques and labels may be used. In this manner, MAC addresses need not be kept on a MAC table (e.g., table 248) of the core-facing line card, e.g., core component 202, and may instead be maintained by individual access components responsible for those MAC addresses.

Illustratively, the techniques described herein may be performed by hardware, software, and/or firmware, such as in accordance with a corresponding "access process" 243, "core process" 244, and/or "central process" 245, e.g., depending upon which action is being performed, where each process may contain computer executable instructions executed by the processor 220 to perform functions relating to the novel techniques described herein. For instance, in a distributed architecture (FIG. 2B), the processes may operate in conjunction generally to perform the techniques described herein, while in a centralized architecture (FIG. 2A) the processes may be separately executed processes, or alternatively separate threads within an overall process.

Notably, other processes may also be executed in a conventional manner in order to support the processes specifically described herein. For example, various topology or routing processes may be used perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art to manage network topologies and to make forwarding decisions. These conventional processes may also operate to provide transmission protocols, such as TCP/IP, various tunneling (encapsulation) protocols, e.g., Multi-Protocol Label Switching (MPLS), pseudowire (PW) operation, and other virtual circuit protocols, accordingly. Alternatively, these conventional processes may be modified to accommodate the techniques described herein, e.g., adding or changing functionality of an MPLS protocol to operate in accordance with one or more embodiments herein.

Operationally, according to one or more embodiments herein, network edge devices, such as PEs, may be virtualized into various "components" with various granularity, such as line cards (LCs), interfaces, bundles, etc. Each of these components, particularly access components, may then be associated with a particular context label (e.g., an MPLS label) to represent each component within forwarded frames in the network. For example, as described herein, two additional types of labels may be used for a particular virtual circuit (e.g., a pseudowire) between two edge devices. That is, in addition to the classic transport (encapsulation) label and virtual circuit label (related to virtual circuit and virtual service, such as a VPLS instance), the context labels may be used to identify the particular components of a network edge device, and a multicast (or unknown address) label, e.g., related to a particular virtual service, may be used where the particular components (e.g., and destination address) are unknown. In this manner, the core component 202 (210) need only hold the context labels and multicast labels in its corresponding table 248. There is thus no need for a MAC table for each virtual service (e.g., VPLS) instance at the core component, and no need to maintain the classic virtual circuit label for the virtual service instance.

Specifically, each network edge device may associate a context label to each of its access components 201 (210). For example, if a component represents a LC, and if the network device has 16 access LCs (customer-facing), then 16 context labels may be allocated to represent those LCs. Each core component 202 (210) is aware of all context labels (e.g., table 248) and thus is able to identify the access component represented by those context labels in the forwarding plane.

Assuming the two network edge devices PE1 and PE2 of FIG. 1, e.g., as two VPLS peer devices, each frame 140*b* may include two context labels, referred to herein as a local (or first) context label and a remote (or second) context labels. In particular, these context labels are specifically associated with the access components (e.g., LCs) where MAC tables (248) are correspondingly stored in PE1 and PE2 for source and destination endpoints of the associated traffic 140*a*. The remote context label generally identifies the access component for the remote/destination edge device, particularly the access component where a Destination MAC (DMAC) of the frame 140*b* is stored on that is remote edge device (i.e., the access component responsible for that particular MAC address). Conversely, the local context label, when included, generally identifies the access component of the local/source edge device, particularly the access component where a Source MAC (SMAC) of the frame 140*b* is stored (i.e., the access component responsible for that particular MAC address). In one embodiment, as described below, the remote context labels may be learned by gleaning the local context label and associating it with the Source MAC address of the frame.

Figure 3:
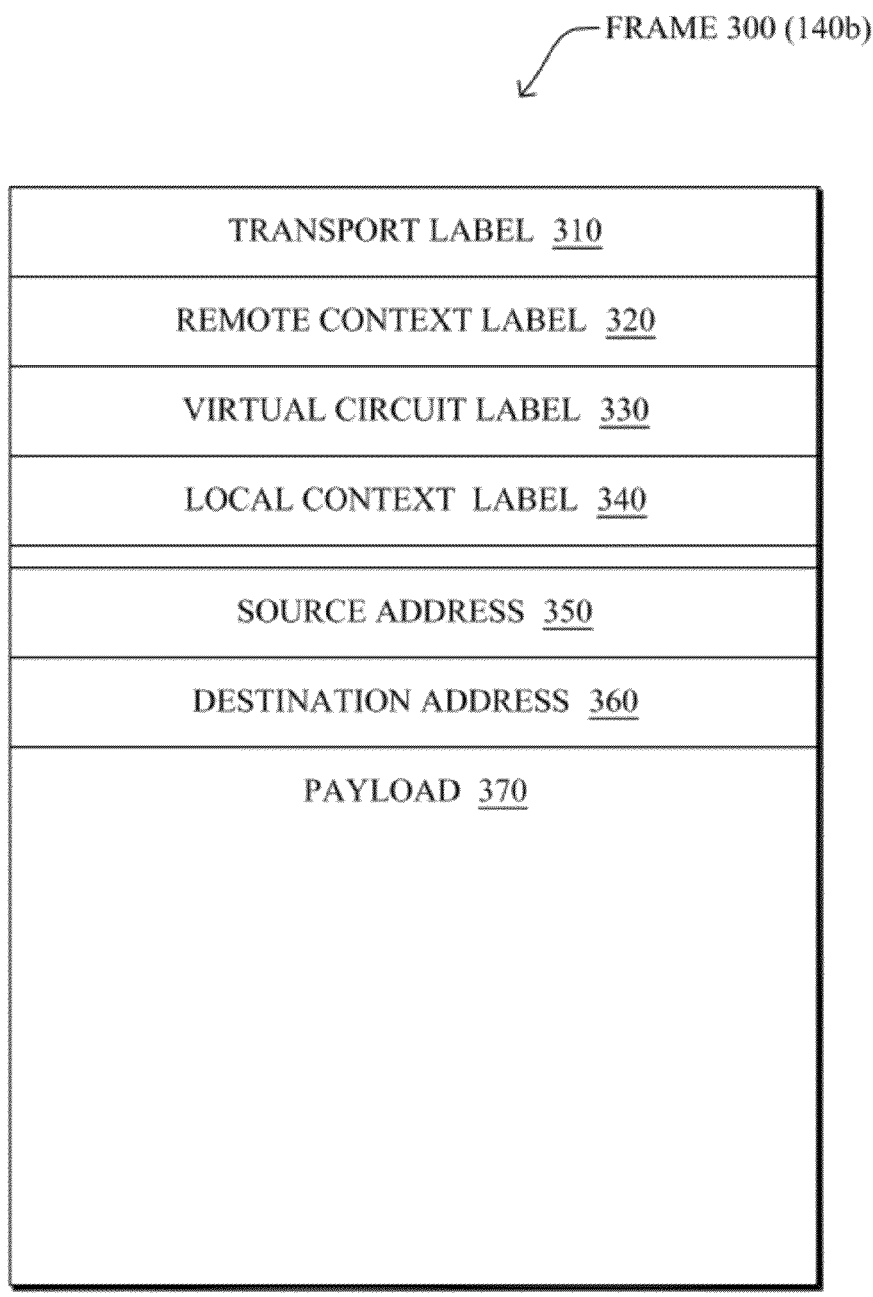
FIG. 3 illustrates an example frame.

FIG. 3 illustrates an example frame 300 (140*b*) that comprises context labels in accordance with one or more embodiments herein. For instance, the label stack for known unicast traffic from PE1 to PE2 may comprise a transport (or encapsulation) label 310 that encapsulates the frame 140*b* to reach the opposing (remote) network edge device, that is, as a top label. In addition, the label stack may comprise a remote (second) context label 320, e.g., of a particular remote access component 201 of the remote (receiving) network edge device, prior to a virtual circuit (e.g., PW) label 330 corresponding to a particular virtual service (e.g., VPLS instance) of the traffic. In one or more embodiments, as described herein, a bottom label may generally further comprise a local (first) context label 340 that corresponds to a particular access component of the local (transmitting) network edge device that originally received the traffic 140*a* to be transmitted over the virtual circuit. Beneath the label stack is the transported frame (traffic 140*a*), which generally contains a source address (e.g., SMAC) 350, a destination address (e.g., DMAC) 360, and the underlying payload 370.

Figure 4:
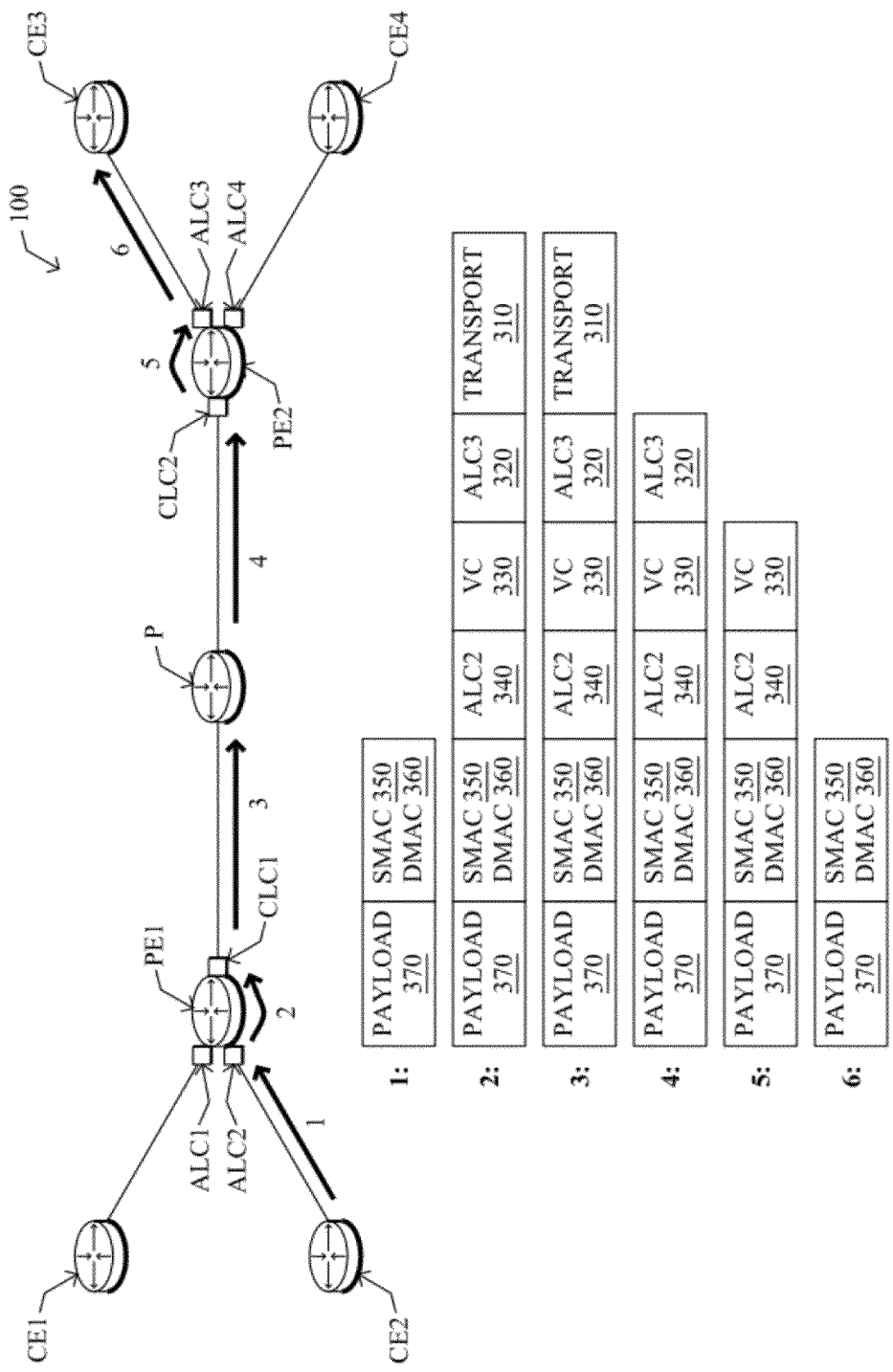
FIG. 4 illustrates an example passing of a frame through the network.

FIG. 4 illustrates an example frame passing (within network 100 of FIG. 1) for a known unicast address in accordance with one or more embodiments described herein, illustratively demonstrating the use of context labels for each transmission. For example, access component ALC2 of PE1 may receiving traffic 140*a* from CE2, originating at an endpoint source address, and destined to a an endpoint destination address. The traffic (e.g., L2 packets) thus contains an SMAC and DMAC, and PE1, particularly access component ALC2, may look up the destination address (DMAC) in its table 248 to determine a corresponding remote network edge device responsible for the destination address. Specifically, given that the destination is a known address, this lookup also is results in a corresponding remote context label for a particular access device (e.g., ALC3) on PE2. ALC2 may then "generate" a frame 140*b* for the traffic by encapsulating the traffic with the appropriate transport label 310, remote context label 320 (for ALC3), a virtual circuit label 340 (e.g., for the particular VPLS instance and virtual circuit of the traffic), and a local context label 340 (for ALC2).

The frame 140*b*/300 may then be switched to the core component CLC1 of PE1, which may then forward the frame toward the second network edge device according to the transport label 310. One or more intermediate network devices (e.g., P routers) may then pass the frame through the network 100 based on the transport label 310. The penultimate hop (the last P router) may then "pop" the transport label 310 from the frame, and forward the frame to the desired network edge device, e.g., PE2. The receiving network edge device (PE2) then receives the frame 300 at its core component (CLC2), with the remaining label stack having the remote context label 320 as the top label. Note that penultimate hop popping is an illustrative example, and those skilled in the art will appreciate that the receiving network edge device may receive a frame with the transport label 310 as the top label, which may then be popped by the receiving network edge device, accordingly.

The exposed top label, i.e., the remote/second context label 320, may then be used to identify the access component (e.g., an edge LC) ALC3 to which the frame is to be forwarded. In particular, in response to the core component's determining that the remote context label 320 indicates a particular access component (e.g., through a lookup operation by the core component CLC2), the frame may be forwarded to that indicated access component. This access component, e.g., ALC3, may then determine the particular virtual service (e.g., VPLS instance) from the virtual circuit label 330, and thus the appropriate bridge, and may forward the traffic toward the destination address (E.g., via CE3). Accordingly, neither core component, CLC1 or CLC2, needs to maintain a full MAC table with the endpoints' MAC addresses.

In addition, according to one or more embodiments herein, particularly for VPLS operation, when the remote network edge device (PE2) receives the frame 300, SMAC learning may occur where the local context label 340 (for ALC2 of PE1) may be associated with the source address 350 by the access component (ALC3) of the receiving device (PE2) for that virtual circuit/service. (If the source address is already known, a confirmation may alternatively occur.) In this manner, the context labels for a particular access component are associated with particular destination addresses through the transmission and reception of previous frames originating from those destination addresses (i.e., source addresses in the previous frames for source address learning). As such, any traffic sent in return from PE2 (particularly ALC3) to the address behind CE2 may be properly tagged with the associated remote context label for ALC2 on PE1. When PE1 receives such a frame, it carries out the above-mentioned forwarding operations (described for PE2) to send the frame to the correct access component (ALC2), accordingly. Notably, source address learning may be shared with other access components of the receiving device, e.g., so long as those access components are related to the corresponding virtual service.

Prior to knowledge of a particular unicast destination address, or to handle multicast destination addresses generally, a specific multicast label may be pushed in place of (as a particular embodiment of) the remote context label 320. For example, as described in more detail below, a multicast label may be used to identify all the components of a remote/receiving edge device, particularly those that are related to a corresponding virtual service instance. That is, if an edge device receives a frame with a multicast label as the top label, then that receiving device may multicast (e.g., flood) the frame to all of its access components that are related to the indicated virtual service instance. The access component that corresponds to the destination address may forward the frame on, while the remaining drop the frame, accordingly. Note that source address learning may also be performed by all of the access components that receive the multicast frame.

In more detail, remote multicast context labels are not learned, but rather are signaled. In one embodiment, this label is signaled per virtual service (e.g., VPLS) instance. For example, each egress edge network device may advertise its remote multicast context label to the ingress edge devices. The ingress edge devices then encapsulate the frames 140*b* with unknown unicast and multicast destination addresses for a given virtual service instance with the context label advertised by the egress edge device.

Figure 5:
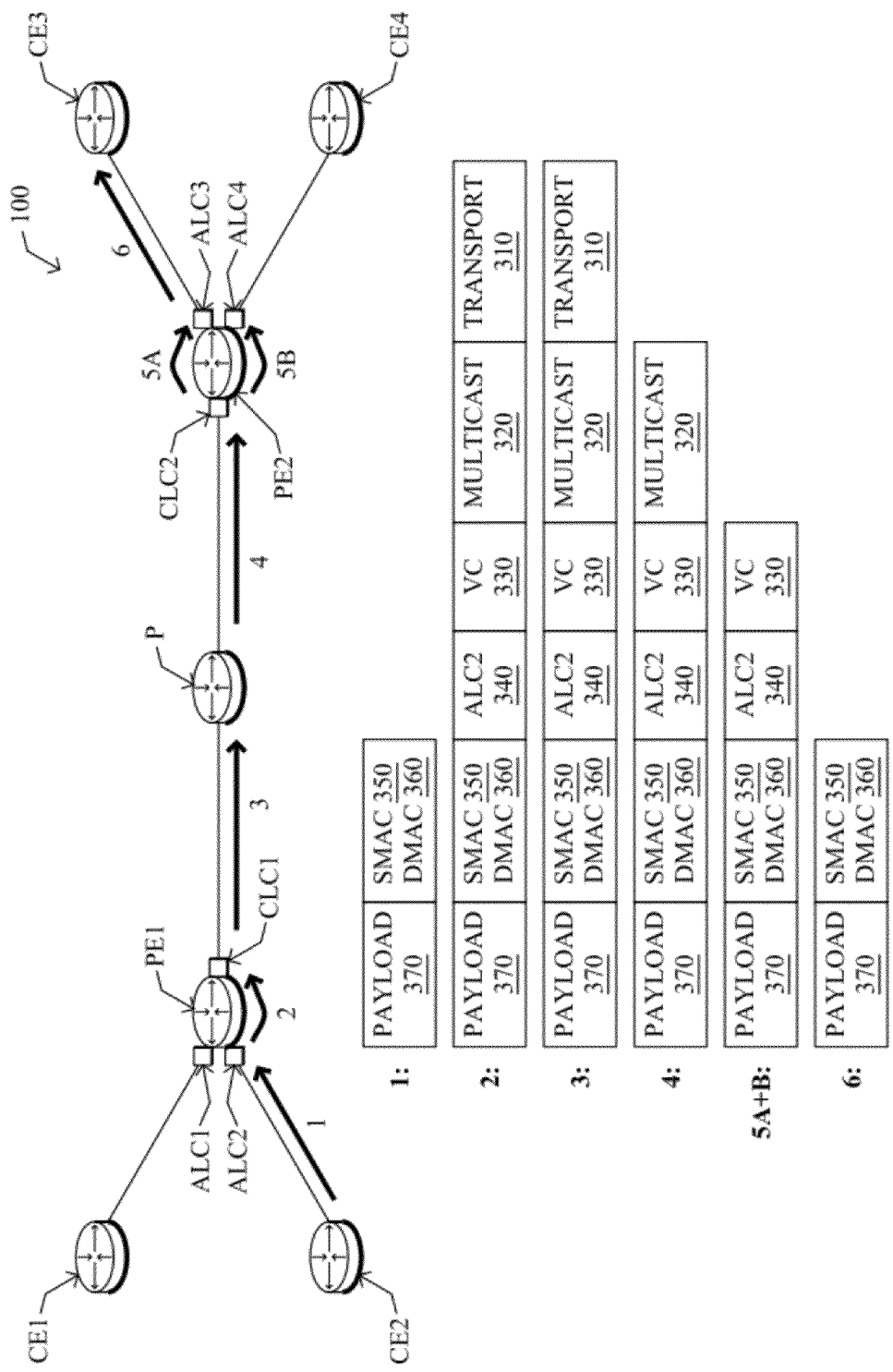
FIG. 5 illustrates an example passing of a multicast frame through the network.

FIG. 5 illustrates an example frame passing (showing labels) according to the scenario above, where a transmitting network edge device encounters an unknown unicast address or multicast (or broadcast) address. For example, PE1 may now receive traffic (e.g., L2 packets) 140*a* from CE2 on an access component ALC2, however based on a lookup operation into a local MAC table 248 (e.g., of ALC2 or otherwise), PE1 may be unable to determine the corresponding remote network edge device, specifically, its egress access component corresponding to the destination address 360 of the traffic. Accordingly, the ingress access component (ALC2) may generate a multicast frame for the traffic by encapsulating the traffic with its local context label 340, the virtual circuit label 330 for the traffic, a corresponding remote multicast context label 320, and a transport label 310. The frame (140*b*/300) may then get switched from the access component to the core component of PE1 (CLC1).

Notably, in one or more embodiments, the multicast frames may be multicasted out of the first network edge device toward one or more remote network edge devices (e.g., of a particular virtual service instance), such as where the destination address is unknown. In one or more alternative embodiments, the multicast frames may still be directed to a specific remote edge device, such as where the virtual circuit is known, but the address is not. Illustratively, each egress node (remote edge device) may advertise its own multicast context label, and the ingress node may perform an ingress replication and send a copy of the unknown packet to every egress node in the same VPLS instance, encapsulating the frame with the multicast context label and the virtual circuit label for the given remote edge node, accordingly. Other scenarios, as will be appreciated by those skilled in the art, may also create different multicast situations, and hence different forwarding actions by respective devices within the network.

The frame 140*b*/300 traverses any intermediate nodes (e.g., P routers) in the network based on the transport label 310, which may be popped upon (or just before) reaching the receiving network edge device, e.g., PE2. The core component (CLC2) of the receiving network device may then examine the exposed remote multicast context label (e.g., determining that it does not indicate a particular access component, but rather is a multicast label), and may correspondingly determine a set of one or more access components that are responsible for a virtual service related to that multicast label. Alternatively, in one embodiment, the core component may also look into the virtual circuit label to determine the virtual service. Once identified, the core component may forward (flood) the frame to its access components associated with the virtual service instance, accordingly.

The edge access components may then look up the virtual circuit label 330 and identify the virtual circuit (e.g., the bridge/PW) and virtual service (e.g., VPLS) instance. Note that each access component may then also examine the next label on the label stack (local label 340), and may learn that the source address 350 is associated with the context label of ALC2, as described above. The edge access components may then look up the destination address 360 in their respective MAC tables (248). If the destination address is known but not local, then the frame is dropped. If it is known and local, the frame is forwarded as a unicast frame. If, however, the destination address is unknown, it may be flooded to local AC (physical) ports attached to the virtual service instance. Said differently, if an access component is not responsible for the destination address (a "non-responsible" access component), i.e., known but not local, then that access component may drop the frame. Otherwise, the responsible access component may forward the traffic toward the destination address, either as a unicast frame or multicast frame, as noted above.

Notably, it may be beneficial to optimize the size of the label stack. As such, according to one or more embodiments herein, the transmitting device's local context label 340 may be included (inserted) in simply the initial one (or few) frames sent to the receiver. Once the transmitter recognizes that its context label is used by the receiver in is the frame coming from the receiver (reverse traffic), the receiver is thus aware of the local context label, and the transmitter can stop including its context label on the frames sent to the receiver. Also, in one or more embodiments, the local context label may again be included after a timeout period to refresh the awareness of remote receiving network edge device of the local context label, such as when a MAC entry is timed-out. A receiver may be configured to use an End Of Stack (EOS) bit on the virtual circuit label 330 to determine whether a transmitter's local context label is present on the received frame (e.g., if unset, the local context label is present, and if set, then the local context label is absent). With this optimization, size of the label stack can be reduced from four labels to three labels for most of the frames.

Furthermore, while the above description primarily references VPLS as the virtual service, in one or more embodiments the virtual service may correspond to a virtual private wire service (VPWS). Scalability of VPWS services may be improved by avoiding the need to store VPWS attachment circuit (e.g., PW) states on core components. This can be achieved using the scheme of signaling two labels per virtual circuit (PW) for the label stack. That is, a VPWS extension may be used to signal a stack of two labels instead of a single label, where the additional label identifies the local component (e.g., LC) associated with the attachment circuit. In other words, the top label is the context identifying the edge access component associated with the PW's forwarding entry, and the bottom label is the virtual circuit label, which is significant to the edge access component represented by the context label.

Figure 6:
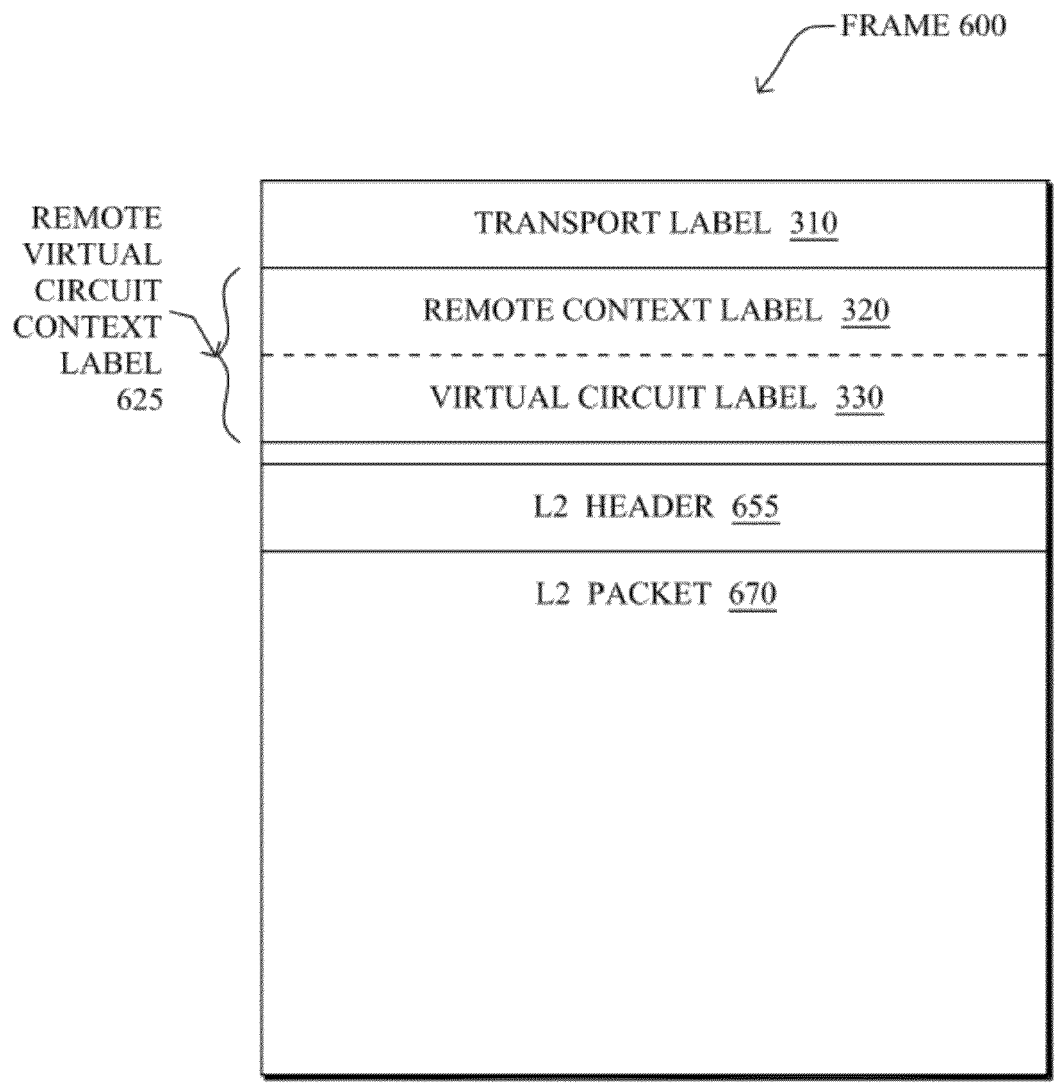
FIG. 6 illustrates another example frame.

According to certain embodiments for VPWS, context labels may not learned via the data plane, but instead may be exchanged in the control plane (e.g., transmitted and/or received) previous to any transmitted frame. As such, a frame sent over a VPWS PW contains only one context label, the remote context label 320 (i.e., in addition to the transport label 310 and virtual circuit label 330 identifying the VPWS). FIG. 6 illustrates an example frame 600 that may be passed when operating according to VPWS virtual service. In particular, the frame 600 (140*b*) comprises the transport label 310, a remote context label 320, virtual circuit label 330, and the underlying L2 packet 670 (e.g., payload 370) with corresponding L2 header 655 (e.g., source and destination addresses 350/360). Notably, in one embodiment herein, the remote context label 320 and virtual circuit label 330 may be combined into a unified remote virtual circuit context label 625, such as where a first portion of the field represents the remote context label, and the second portion represents the virtual circuit (and VPWS instance). For example, using various longest-match techniques, the field may be parsed to identify proper forwarding procedures between the core component of an edge device and its access components, according to the techniques described herein.

Figure 7:
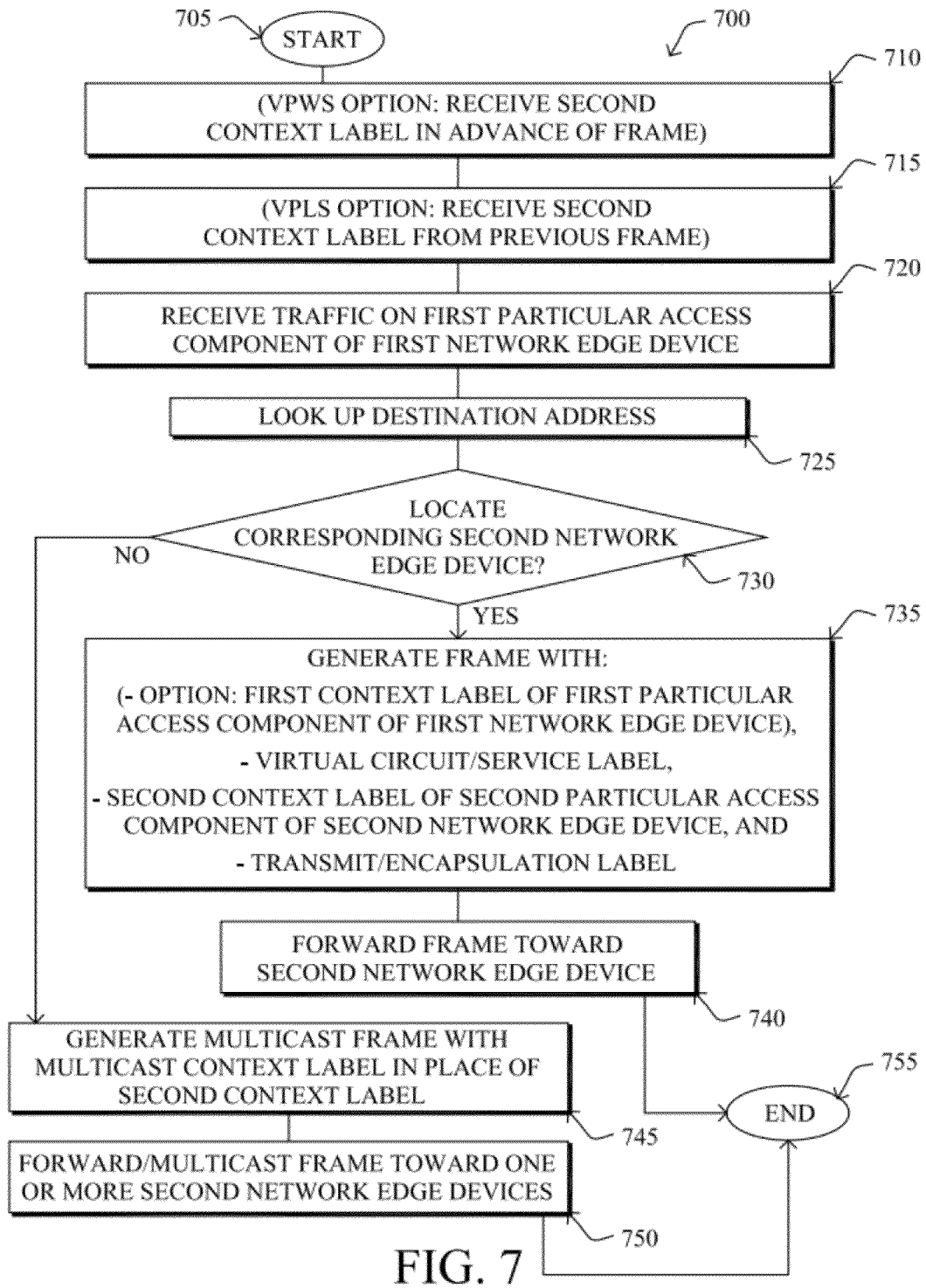
FIG. 7 illustrates an example procedure for using context labels from the perspective of a transmitting device.

FIG. 7 illustrates an example simplified procedure for using context labels from the perspective of a transmitting device (e.g., PE1, a first network edge device) in accordance with one or more embodiments described herein. The procedure 700 starts at step 705, and may continue to step 710, where, when operating according to VPWS, the transmitting device (e.g., PE1) may receive a second context label corresponding to the receiving device (e.g., PE2, particularly ALC3) in advance of transmitting any frames toward the destination below. Alternatively, such as for VPLS, the transmitting device may (or may not) receive the second context label from a previously received frame in step 715. (Note that certain steps of FIG. 7, as noted below, may not be suitable to both VPLS and VPWS instances, as described herein.)

In step 720, the transmitting device, may receive traffic 140*a* on one of its access components (e.g., ALC2), and in step 720 looks up the destination address to determine whether the address is stored in its table 248, and to thus locate a corresponding second network edge device (receiving device) responsible for that address in step 730. If a corresponding device is located in step 730 (e.g., PE2), then in step 735 a frame 140*b* may be generated by the transmitting device that has a corresponding virtual circuit label 330, a second (remote) context label 320 that corresponds to the particular access component of the receiving device (e.g., ALC3) as learned previously, as well as a transport/encapsulation label 310 to reach the receiving device through the network. As described above, the frame 140*b* (300) may also (optionally, and only for VPLS) include a first context label 340 of a first particular access component (e.g., ALC2) of the transmitting device. The frame 140*b*/300 may then be forwarded in step 740 from the is transmitting device (e.g., its core component) toward the receiving device, and the procedure ends in step 755.

Alternatively, if in step 730 the destination address is not known, then in step 745 the frame 140*b* may be generated as a multicast frame. In particular, this implies that a multicast context label may be used in place of the second context label 320 (for VPLS), such that a receiving device may multicast the frame to all of its appropriate access components, accordingly. Notably, if the destination address's receiver device is known, but the particular access component of the receiving device is not known, then the transport label 310 comprises the single (unicast) receiver device, and the second/remote context label may contain the multicast label, accordingly. However, where nothing is known about the destination address, the transmitting device may include a multicast (or broadcast) label as the transport/encapsulation label 310. The frame may then be forwarded in step 750 to reach the one or more receiver devices, and the procedure 700, for the transmitting device, ends in step 755.

Figure 8:
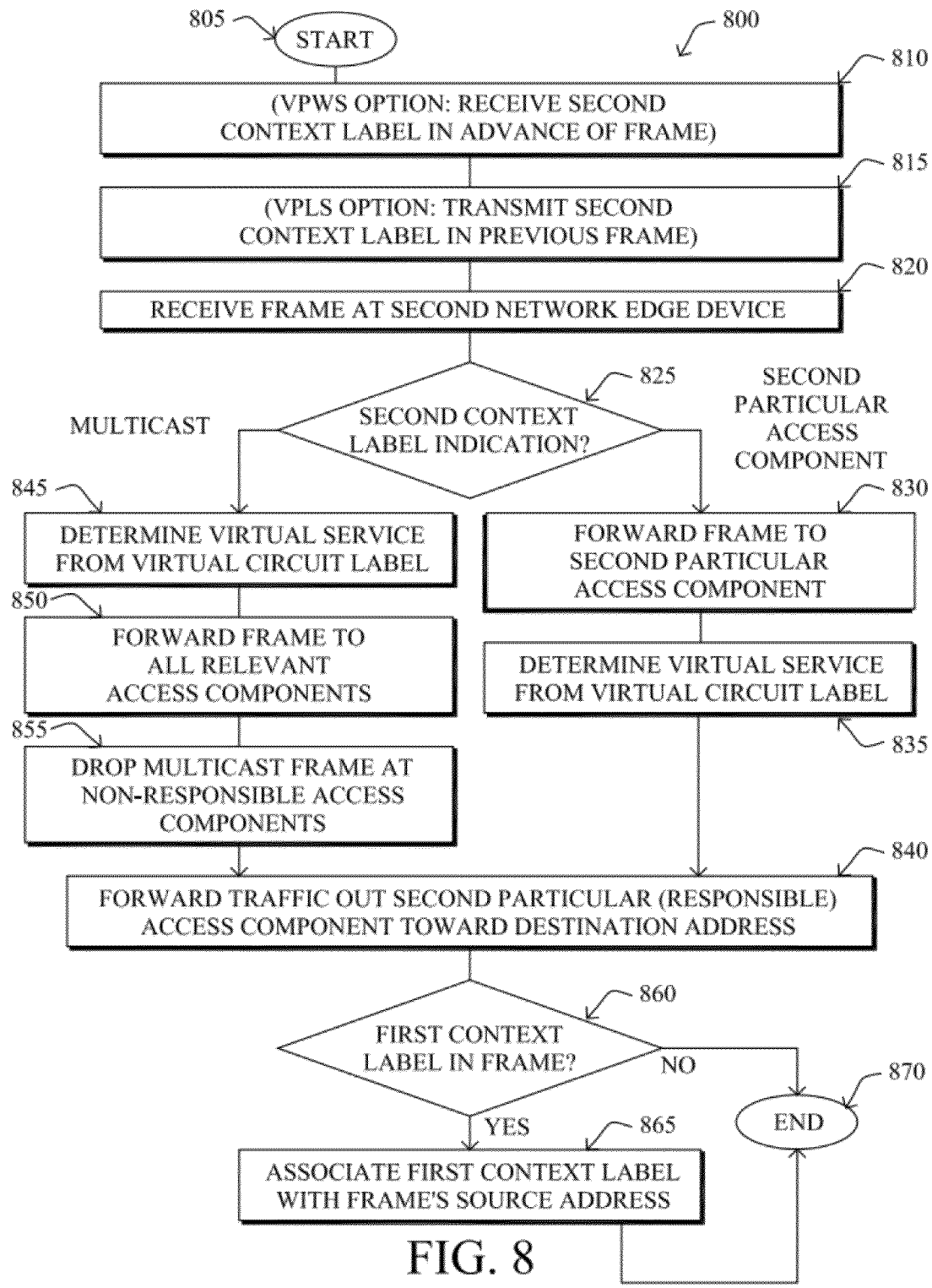
FIG. 8 illustrates an example procedure for using context labels from the perspective of a receiving device.

FIG. 8 illustrates an example simplified procedure for using context labels from the perspective of a receiving device (e.g., PE2, a second network edge device) in accordance with one or more embodiments described herein. The procedure 800 starts at step 805, and may continue to step 810, where, when operating according to VPWS, the receiving device (e.g., PE2) may transmit a second context label corresponding to the receiving device (e.g., particularly ALC3) in advance of receiving any frames for the destination below. Alternatively, such as for VPLS, the receiving device may (or may not) have already transmitted the second context label in a previously received frame in step 815. (Note also that certain steps of FIG. 8, as noted below, may not be suitable to both VPLS and VPWS instances, as described herein.)

In step 820, the receiving device (second network edge device) may receive a frame 140*b* on a core component, and may determine in step 825 what is indicated by the second context label 320 within the frame. If a particular access component of the receiving device is indicated, then the frame is forwarded (e.g., internally) to that particular access component in step 830. From there, a particular virtual service may be determined in step 835 from the corresponding virtual circuit label 330, and the resultant traffic 140*a* may be forwarded out that particular access component toward the destination address in step 840.

Alternatively, if in step 825 it is determined that the second context label 320 (or, notably, the transport label 310) does not specifically indicate an access component (or the receiving device), then the frame may be considered a multicast frame (for unknown addresses and/or context labels), and the procedure continues to step 845. In step 845, a particular virtual service may be determined from the corresponding virtual circuit label 330, and then in step 850, the receiving device forwards (e.g., internally) the frame to all relevant access components, i.e., those responsible for that particular virtual service. Any non-responsible access components, that is, those behind which the destination address does not reside, may drop the multicast frame in step 855. Conversely, a responsible access component, that is, the one behind which the destination address does reside, may forward the traffic toward the destination address, accordingly, in step 840.

Regardless of how an access component receives the frame 140b, in step 860 if there is a first context label 340 within the frame (e.g., for VPLS only), then in step 865 the access component may associate that first context label with the frame's source address 350, or otherwise confirm the label if it has previously been associated. The procedure 800 for the receiving device may then end in step 870.

In closing, the novel techniques described herein use context labels to scale MAC tables on computer network edge devices. By providing an extension to virtual services (VPLS/VPWS) to provide two context labels (local and remote components associated with virtual circuit endpoints), the novel techniques allow for a selective installation of virtual service labels and MAC tables on access (edge) and core LCs. In particular, the techniques described above scale and support more MAC tables and virtual services on the same network device since the core LC does not need to hold any MAC table per virtual service instance, nor any VPLS or VPWS virtual circuit labels, but instead only holds one label (multicast) per virtual service instance. As such, there is minimal is forwarding state on core facing LCs (i.e., no state per virtual circuits and no MAC table state). Also, the dynamic aspects of one or more embodiments described herein, such as the distribution of the labels, alleviate the need for cumbersome and inefficient manual configuration.

While there have been shown and described illustrative embodiments use context labels to scale MAC tables on computer network edge devices, it is to be understood that various other adaptations and modifications may be made within the spirit and scope of the embodiments herein. For example, the embodiments have been shown and described herein showing network edge devices having core and access (customer/edge) linecards. However, the embodiments in their broader sense are not so limited, and may, in fact, be used with any device suitably situated network device having a distributed architecture at the edge of virtual services. Further, while dual labels (first/local and second/remote) are shown above, the techniques may also be altered to provide for a single label approach. For instance, each label may identify both a local and remote component, e.g., aggregating the two separate labels described above, such that each component may be parsed from the single label.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible and non-transitory computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving traffic at an access component of a local network edge device in a computer network; and
   if the local network edge device is aware of a remote network edge device in the computer network used to reach a destination of the traffic,
      generating a frame for the traffic, the frame comprising
         a virtual circuit label corresponding to a particular virtual service of the traffic, and
         a remote context label that identifies an access component of the remote network edge device to which the traffic is to be forwarded upon arrival at the remote network edge device, the access component being a portion of the remote network edge device that is capable of determining the particular virtual service of the traffic from the virtual circuit label,
      until the remote network edge device becomes aware of a local context label, including, in the frame, the local context label of the access component of the local network edge device which received the traffic in the frame,
      forwarding the frame from the local network edge device towards the remote network edge device,
      waiting a timeout period during which the local context label is not included within frames for the traffic; and
      after the timeout period, again including the local context label within frames for the traffic to refresh the awareness of the remote network edge device of the local context label.

2. The method as in claim 1, further comprising:
   if the local network edge device is not aware of a remote network edge device in the computer network used to reach a destination of the traffic,
      generating a multicast frame for the traffic, the multicast frame comprising
         a virtual circuit label corresponding to a particular virtual service of the traffic, and
         a multicast context label, and
      multicasting the multicast frame from the local network edge device toward one or more remote network edge devices.

3. The method as in claim 1, further comprising:
   receiving, by the local network edge device, the remote context label of the access component of the remote network edge device in a frame from the access component of the remote network edge device.

4. The method as in claim 1, further comprising:
   receiving, by the local network edge device, the remote context label of the access component of the remote network edge device prior to receiving any frames from the access component of the remote network edge device.

5. The method as in claim 1, wherein the virtual service is one of either a virtual private local area network (LAN) service (VPLS) or a virtual private wire service (VPWS).

6. The method as in claim 1, wherein each access component is selected from a group consisting of: a line card (LC), an interface, and a bundle.

7. The method as in claim 1, wherein the virtual circuit label and remote context label are a unified remote virtual circuit context label, wherein a first portion of the unified remote virtual circuit context label represents the remote context label, and a second portion represents the virtual circuit label.

8. A method, comprising:
receiving a frame of traffic at a core component of a remote network edge device in a computer network, the frame including a label stack with a remote context label that identifies an access component of the remote network edge device to which the traffic is to be forwarded for determination of a particular virtual service, and a virtual circuit label corresponding to the particular virtual service;
in response to the remote context label of the label stack of the frame,
identifying the access component of the remote network edge device,
forwarding the frame to the access component of the remote network edge device,
determining, by the access component of the remote network edge device, the particular virtual service of the frame from the virtual circuit label, and
forwarding the traffic from the frame out the access component of the remote network edge device towards an endpoint for the traffic; and
in response to the remote context label of the label stack of the frame not identifying an access component of the remote network edge device,
determining that the remote context label corresponds to one of either a multicast label or an unknown address label,
forwarding the frame to all access components corresponding to the virtual service indicated by at least one of either the remote context label or the virtual circuit label,
in response to a non-responsible access component not being responsible for the endpoint for the traffic, dropping the frame by the non-responsible access component, and
in response to a responsible access component being responsible for the endpoint for the traffic, forwarding the traffic out the responsible access component toward the endpoint for the traffic.

9. The method as in claim 8, wherein the label stack of the frame further comprises a context label of an access component of a local network edge device that generated the frame, the method further comprising:
associating, by the access component of the remote network edge device, a local context label of the access component of the local network edge device with a source address of the traffic.

10. The method as in claim 9, further comprising:
receiving traffic from one or more network devices;
generating a second frame for the traffic, the second frame comprising:
a virtual circuit label corresponding to a particular virtual service of the traffic, and
a remote context label that identifies an access component of the local network edge device to which the traffic is to be forwarded upon arrival at the local network edge device, the access component of the local network edge device being a portion of the local network edge device that is capable of determining the particular virtual service of the traffic from the virtual circuit label; and
forwarding the second frame out the core component of the remote network edge device towards the local network edge device.

11. The method as in claim 8, further comprising:
transmitting, to a local network edge device by the remote network edge device, the remote context label of the access component of the remote network edge device in a previous frame from the access component of the remote network edge device.

12. The method as in claim 8, further comprising:
transmitting, to a local network edge device by the remote network edge device, the context label of the access component of the remote network edge device prior to any frames from the access component of the remote network edge device.

13. The method as in claim 8, wherein the virtual service is one of either a virtual private local area network (LAN) service (VPLS) or a virtual private wire service (VPWS).

14. The method as in claim 8, wherein each access component and core component is each selected from a group consisting of: a line card (LC), an interface, and a bundle.

15. The method as in claim 8, wherein the virtual circuit label and remote context label are a unified remote virtual circuit context label, wherein a first portion of the unified remote virtual circuit context label represents the remote context label, and a second portion represents the virtual circuit label.

16. An apparatus, comprising:
an access component configured to receive traffic from one or more network devices;
a processor coupled to the access component and configured to execute processes; and
a memory configured to store a process executable by the processor, the process, when executed, operable to,
if the apparatus is aware of a remote network edge device in a computer network used to reach a destination of the traffic received from the one or more network devices,
generate a frame for the traffic, the frame comprising
a virtual circuit label corresponding to a particular virtual service of the traffic, and
a remote context label that identifies an access component of the remote network edge device to which the traffic is to be forwarded upon arrival at the remote network edge device, the access component of the remote network edge device being a portion of the remote network edge device that is capable of determining the particular virtual service of the traffic from the virtual circuit label,
until the remote network edge device becomes aware of a local context label, include, in the frame, the local context label of the access component configured to receive the traffic from the one or more network devices,
forward the frame from the apparatus towards the remote network edge device,
wait a timeout period during which the local context label is not included within frames for the traffic; and
after the timeout period, again include the local context label within frames for the traffic to refresh the awareness of the remote network edge device of the local context label.

17. The apparatus as in claim 16, wherein the process, when executed, is further operable to, if the apparatus is not aware of the remote network edge device in the computer network used to reach the destination of the traffic, generate a multicast frame for the traffic, the multicast frame comprising
- a virtual circuit label corresponding to a particular virtual service of the traffic, and
- a multicast context label, and multicasting the multicast frame from the local network edge device toward one or more remote network edge devices.

18. The apparatus as in claim 16, wherein the frame further comprises a local context label of the access component of the apparatus.

19. An apparatus, comprising:
- a core component configured to receive a frame, the frame including a label stack with a remote context label and a virtual circuit label corresponding to a particular virtual service for traffic from the frame; and
- an access component configured to communicate traffic from the frame to one or more endpoints, the access component including
  - a processor configured to execute processes, and
  - a memory configured to store a process executable by the processor, the process, when executed, operable to,
    - in response to the remote context label of the label stack of the frame identifying the access component, determine the particular virtual service of the frame from the virtual circuit label at the access component, and forward traffic from the frame out the access component towards an endpoint for the traffic, and
    - in response to the remote context label of the label stack of the frame not identifying the access component,
      - determine that the remote context label corresponds to one of either a multicast label or an unknown address label,
      - in response to the access component being a non-responsible access component that is not responsible for the endpoint for the traffic, drop the frame at the non-responsible access component, and
      - in response to the access component being a responsible access component that is responsible for the endpoint for the traffic, forward the traffic out the responsible access component toward the endpoint for the traffic.

20. The apparatus as in claim 19, wherein the label stack of the frame further comprises a local context label of an access component of a local network edge device that generated the frame, and wherein the process, when executed, is further operable to associate the local context label of the access component of the local network edge device with a source address of the traffic.

21. The apparatus as in claim 20, wherein the access component of the apparatus is further configured to receive traffic from one or more network devices and the process, when executed, is further operable to generate a second frame for the traffic, the second frame comprising
- a second virtual circuit label corresponding to a second particular virtual service of the traffic, and
- a second remote context label that identifies a second access component of the local network edge device to which the traffic is to be forwarded upon arrival at the local network edge device, the second access component of the local network edge device being a portion of the local network edge device that is capable of determining the second particular virtual service of the traffic from the second virtual circuit label, and forward the second frame out the core component of the apparatus towards the local network edge device.

* * * * *